US012575511B2

(12) United States Patent
Shah

(10) Patent No.: US 12,575,511 B2
(45) Date of Patent: Mar. 17, 2026

(54) VERTICAL LAWN

(71) Applicant: Sujay Ashvin Shah, Mumbai (IN)

(72) Inventor: Sujay Ashvin Shah, Mumbai (IN)

(73) Assignee: Sujay Ashvin Shah, Mumbai (IN)

( * ) Notice: Subject to any disclaimer, the term of this patent is extended or adjusted under 35 U.S.C. 154(b) by 0 days.

(21) Appl. No.: 18/700,097

(22) PCT Filed: Oct. 11, 2022

(86) PCT No.: PCT/IB2022/059711
§ 371 (c)(1),
(2) Date: Apr. 10, 2024

(87) PCT Pub. No.: WO2023/062513
PCT Pub. Date: Apr. 20, 2023

(65) Prior Publication Data
US 2024/0415077 A1     Dec. 19, 2024

(30) Foreign Application Priority Data

Oct. 11, 2021     (IN) .............................. 202121046149

(51) Int. Cl.
*A01G 20/20* (2018.01)
*A01G 9/02* (2018.01)
(Continued)

(52) U.S. Cl.
CPC ............. *A01G 20/20* (2018.02); *A01G 9/025* (2013.01); *A01G 24/18* (2018.02); *A01G 24/46* (2018.02);
(Continued)

(58) Field of Classification Search
CPC ........ A01G 20/20; A01G 24/18; A01G 24/46; A01G 24/44; A01G 24/40; A01G 9/025; A01G 31/02; A01G 9/022; A01G 9/023
See application file for complete search history.

(56) References Cited

U.S. PATENT DOCUMENTS 5,600,919 A * 2/1997 Kummermehr .......... C05G 5/40
47/57.6
2008/0209805 A1* 9/2008 Daures ................... A01G 9/025
47/66.7
(Continued)

FOREIGN PATENT DOCUMENTS

CN       101553108 B     8/2011
EP       2983463 B1      5/2017
(Continued)

*Primary Examiner* — Kimberly S Berona
*Assistant Examiner* — Steven J Shur
(74) *Attorney, Agent, or Firm* — The Webb Law Firm

(57) ABSTRACT

The present disclosure relates to vertical gardens. The present disclosure envisages a vertical lawn. The vertical lawn includes an artificial substrate, a water-proofing layer applied on the substrate, and a drainage sheet provided on the water-proofing layer. The drainage sheet has a plurality of projections configured thereon to facilitate flow of water therebetween. A geotextile sheet is fitted on an operative front surface of the drainage sheet. A hydrophilic rock mineral wool layer is secured to the operative front surface of the geotextile sheet. The rock mineral wool layer configured to absorb and retain moisture therein. A lawn mat secured to the rock mineral wool layer.

8 Claims, 7 Drawing Sheets

(51) Int. Cl.

| | | |
|---|---|---|
| *A01G 24/18* | (2018.01) | |
| *A01G 24/46* | (2018.01) | |
| *A01G 31/02* | (2006.01) | |
| *B32B 3/30* | (2006.01) | |
| *B32B 5/02* | (2006.01) | |
| *B32B 7/08* | (2019.01) | |
| *B32B 19/06* | (2006.01) | |
| *B32B 27/12* | (2006.01) | |

(52) U.S. Cl.
CPC ................ *A01G 31/02* (2013.01); *B32B 3/30* (2013.01); *B32B 5/022* (2013.01); *B32B 7/08* (2013.01); *B32B 19/06* (2013.01); *B32B 27/12* (2013.01); *B32B 2307/718* (2013.01); *B32B 2307/7265* (2013.01); *B32B 2307/7376* (2023.05)

(56) References Cited

U.S. PATENT DOCUMENTS

| | | | | |
|---|---|---|---|---|
| 2010/0095584 A1* | 4/2010 | Huet | ....................... | A01G 9/025 47/39 |
| 2016/0050856 A1* | 2/2016 | Shah | ....................... | A01G 9/022 47/65.5 |

FOREIGN PATENT DOCUMENTS

| | | | | | |
|---|---|---|---|---|---|
| GB | 2531796 A | * | 5/2016 | ............... | D04H 1/00 |
| WO | WO-2008146131 A2 | * | 12/2008 | ............. | A01G 9/025 |

* cited by examiner

105

107

VERTICAL LAWN

CROSS REFERENCE TO RELATED APPLICATIONS

This application is the United States national phase of International Patent Application No. PCT/IB2022/059711 filed Oct. 11, 2022, and claims priority to Indian patent application Ser. No. 20/212,1046149 filed Oct. 11, 2021, the disclosures of which are hereby incorporated by reference in their entireties.

BACKGROUND OF THE INVENTION

Field of the Invention

The present invention relates to vertical gardens.

Description of Related Art

The background information herein below relates to the present disclosure but is not necessarily prior art.

Vertical gardens are series of vegetation such as grass, or plants such as succulents or hydroponics grown in bags, planters or cups that are vertically suspended on walls for beautifying spaces with limited surface area. The bags, planters or cups are discrete elements requiring separate frames, and hitherto without their help the grass or the plants cannot be grown at any inclined angle.

The biggest disadvantage of a vertical garden is that moisture from the bags or the planters seep on to the walls on which they are supported, and cause rotting of the wall if not installed properly. Further, excess water from the garden tend to stain or dirty the walls and the surrounding areas.

There is therefore felt a need for a vertical garden that alleviates the aforementioned drawbacks.

SUMMARY OF THE INVENTION

Some of the objects of the present disclosure, which at least one embodiment herein satisfies, are as follows:

An object of the present disclosure is to provide a vertical lawn.

Another object of the present disclosure is to provide a vertical lawn which adds to the aesthetic appeal of spaces.

Yet another object of the present disclosure is to provide a vertical lawn which allows draining of water therefrom, without affecting walls on which they are supported.

Other objects and advantages of the present disclosure will be more apparent from the following description, which is not intended to limit the scope of the present disclosure.

The vertical lawn comprises an artificial substrate, a water-proofing layer applied on the substrate, and a drainage sheet provided on the water-proofing layer. The drainage sheet has a plurality of projections configured thereon to facilitate flow of water between the projections. A geotextile sheet is fitted on an operative front surface of the drainage sheet. A hydrophilic rock mineral wool layer is secured to the operative front surface of the geotextile sheet. The rock mineral wool layer configured to absorb and retain moisture therein. A lawn mat secured to the rock mineral wool layer.

BRIEF DESCRIPTION OF THE DRAWINGS

A vertical lawn, of the present disclosure will now be described with the help of the accompanying drawing, in which.

LIST OF REFERENCE NUMERALS

Figure 1A:
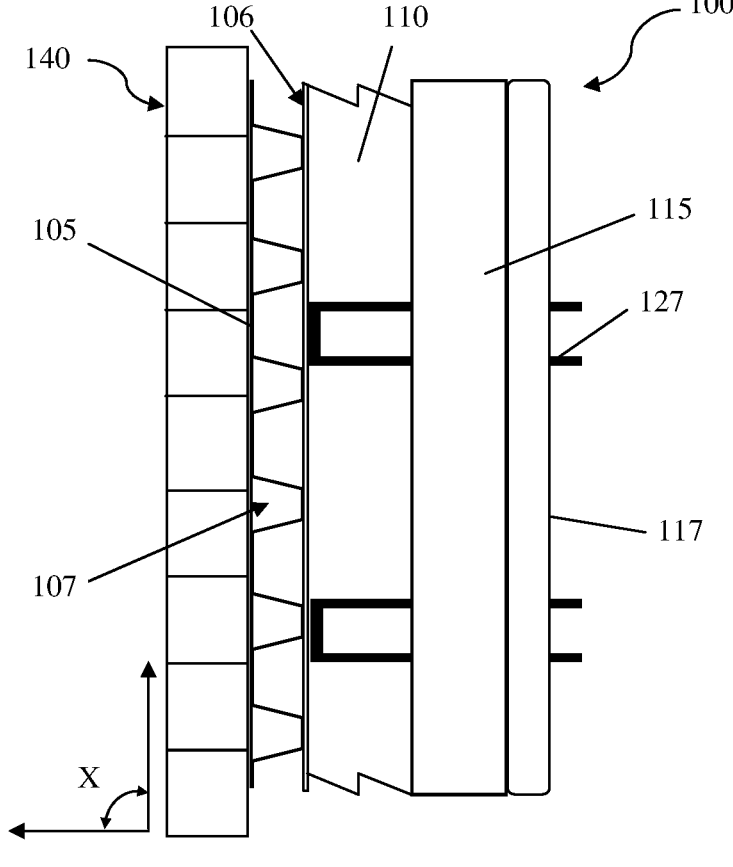
FIG. 1A illustrates a cross-sectional side view of the lawn mounted on a wall at a vertical axis, in accordance to an aspect of the present disclosure.

100 vertical lawn
105 drainage sheet
106 geotextile sheet
107 projection
110 rock mineral wool layer
115 lawn mat
117 grass layer
125 strip fitment
127 bracket
130 bolt
140 substrate
142 brace
143 base of the brace
144 first arm of the brace
145 intermediate arm of the brace
146 perforations on the intermediate arm of the brace
X angle of the vertical lawn from the horizontal

DESCRIPTION OF THE INVENTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a", "an" and "the" may be intended to include the plural forms as well, unless the context clearly suggests otherwise. The terms "comprises", "comprising", "including", "includes" and "having" are open-ended transitional phrases and therefore specify the presence of stated features, elements, modules, units and/or components, but do not forbid the presence or addition of one or more other features, elements, components, and/or groups thereof.

As used in the present disclosure, the following terms are generally intended to have the meaning as set forth below, except to the extent that the context in which they are used indicate otherwise.

Lawn: The term 'lawn' herein the specification refers to continuous series of grass, sedums, ground covers, and plants including succulents, hydroponics or flowering plants.

Grass mat: The term 'grass mat' herein the specification refers to natural grass grown from grass seeds on soil. The grass mat can be rectangular pieces or rolls of grass from which they could be cut.

Vertical: The term 'vertical' herein the specification refers to an inclined angle ranging from 45° to 120° with respect to the ground.

A vertical lawn (100), of the present disclosure, will now be described with reference to FIG. 1A through FIG. 4.

The vertical lawn (100) comprises an artificial substrate (140), a water-proofing layer applied on the substrate (140), and a drainage sheet (105) provided on the water-proofing layer (not specifically labelled in Figures). The drainage sheet (105) has a plurality of projections (107) configured thereon to facilitate flow of water between the projections (107). A geotextile sheet (106) is fitted on an operative front surface of the drainage sheet (105). A hydrophilic rock mineral wool layer (110) is secured to the operative front surface of the geotextile sheet (106). The rock mineral wool layer (110) configured to absorb and retain moisture therein. A lawn mat (115) secured to the rock mineral wool layer (110).

The vertical lawn (100) includes a lawn mat (115) having a grass layer (117) grown thereon. The grass layer could be substituted by plants such as succulents, or hydroponics or herbs. The lawn mat (115) is mounted on a rock mineral wool layer (110).

Figure 1B:
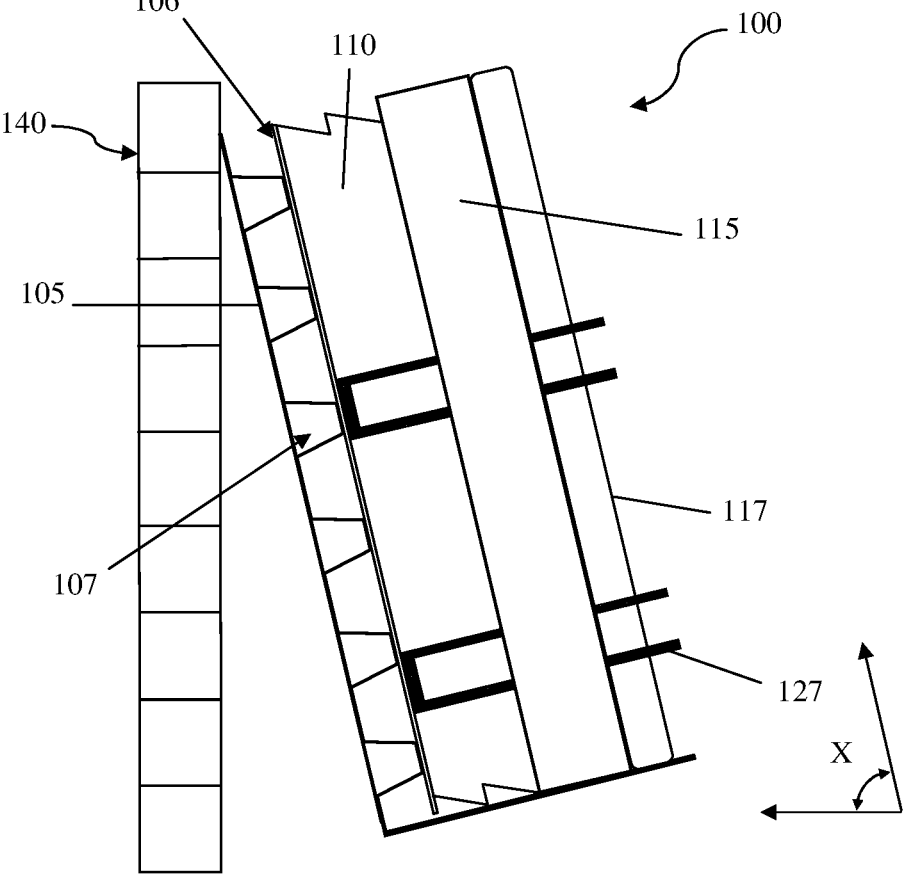
FIG. 1B illustrates another cross-sectional side view of the lawn mounted on a wall at an inclined axis.
Figure 1C:
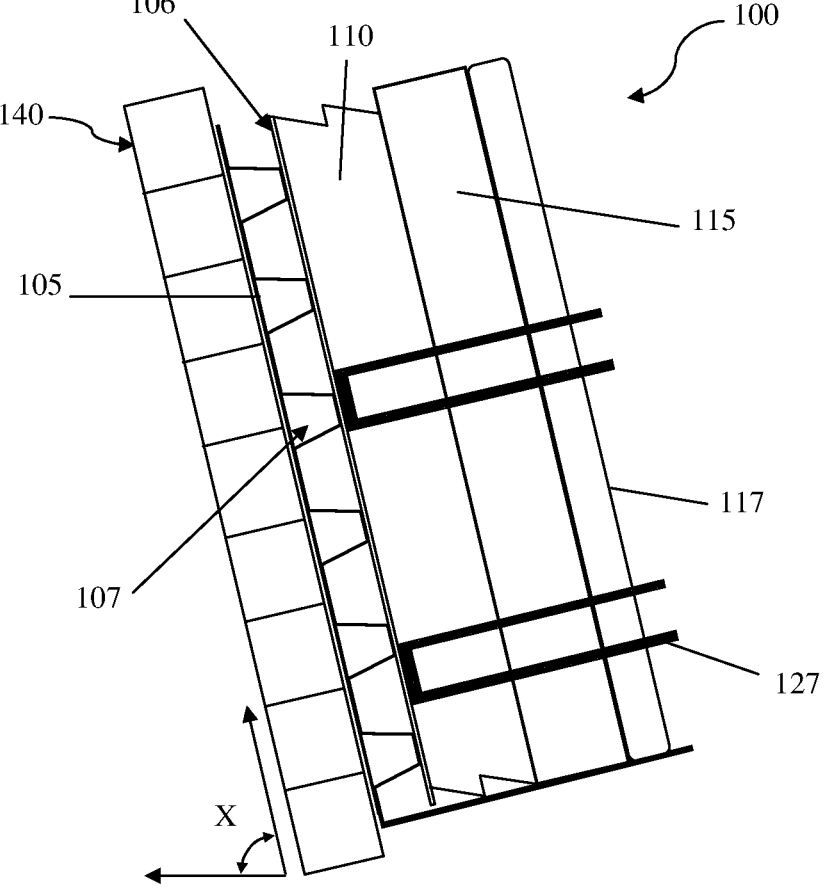
FIG. 1C illustrates a further cross-sectional side view of the lawn mounted on a wall having inclined axis.

In an embodiment, the vertical lawn (100) is configured to incline at an angle ranging between 45° to 120° with respect to the ground, as shown in FIG. 1A through FIG. 1C. In another embodiment, the vertical lawn (100) is configured to incline at an angle of 90° with respect to the ground, as particularly seen in FIG. 1A.

In yet another embodiment, the artificial substrate (140) is an inclined wall.

In one embodiment, the water-proofing layer is a layer of natural water-repellant material, or a layer of synthetic water-repellant material.

In an embodiment, the water-proofing layer is a water-repellent sheet. In another embodiment, the water-proofing layer is a liquid water-repellent applied on the substrate (140) in coats.

In yet another embodiment, the water-proofing layer is selected from the group consisting of elastomeric material, cementitious material, latex, acrylic, polyurethane or a combination thereof.

In still another embodiment, the thickness of the water-proofing layer ranges between 100 microns to 2000 microns.

In an embodiment, the projections (107) are configured on an operative front surface of the drainage sheet (105). In another embodiment, the projections (107) are configured on both operative front surface and operative back surface of the drainage sheet (105).

Figure 3:
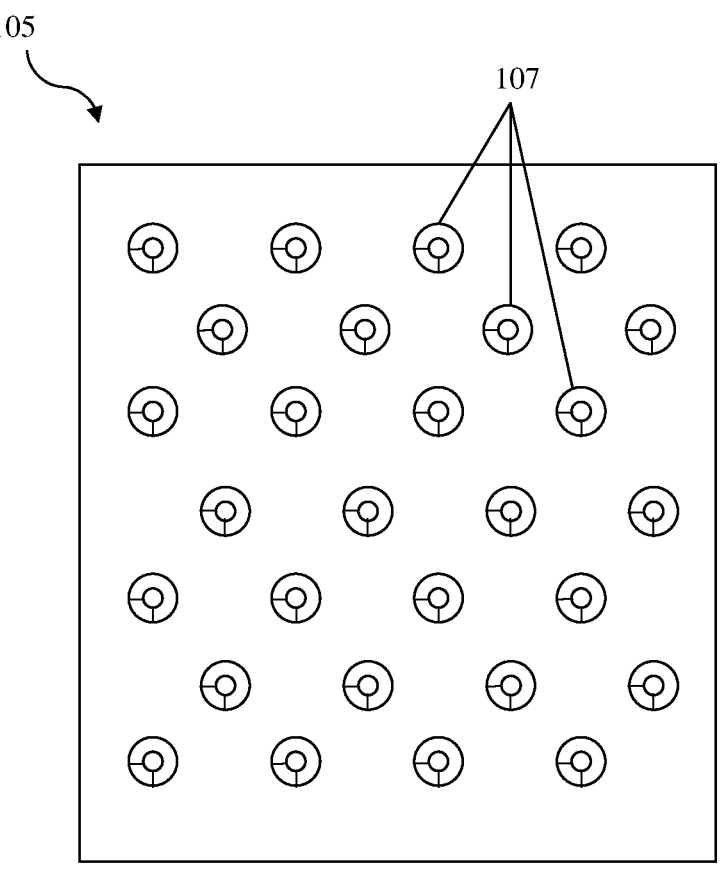
FIG. 3 illustrates an operative front view of a drainage sheet of the lawn, of FIG. 1.

In an embodiment, the projections (107) are configured on the drainage sheet (105) in a staggered configuration, as shown in FIG. 3, to define space between each projection (107).

In another embodiment, each of the projections (107) has a configuration selected from the group consisting of cup-shaped configuration, trapezoidal configuration, and dimpled configuration.

In yet another embodiment, the projection (107) as a shape selected from the group consisting of circular, elliptical, ovular, rectangular, and octagonal. In still another embodiment, the height of each projection (107) varies between 4 mm to 25 mm.

In an embodiment, the drainage sheet (105) is of a material selected from the group consisting of low density polyethylene (LDPE), high density polyethylene (HDPE), polypropylene, polyolefins, polyvinyl chloride, polyesters, polystyrene, recycled polymers, composites or a combination thereof.

In another embodiment, the thickness of the drainage sheet (105) ranges between 0.5 mm to 1.5 mm.

The geotextile sheet (106) allows percolation of water therethrough while preventing direct contact of the rock mineral wool layer (110) with the drainage sheet (105). Further, the geotextile sheet prevents drainage of any loose fibers of the rock mineral wool layer (110).

In an embodiment, the geotextile sheet (106) is manufactured from non-woven continuous fibers of a material selected from polypropylene, polyethylene, polyester (PET), virgin polymer, recycled polymer, composites, or a combination thereof. In another embodiment, the thickness of the geotextile sheet (106) ranges between 0.3 mm to 40 mm. In yet another embodiment, the weight of the geotextile sheet (106) ranges between 80 GSM to 4000 GSM. In a preferred embodiment, the weight of the geotextile sheet (106) ranges between 80 GSM to 1000 GSM.

In one embodiment, the rock mineral wool layer (110) is of a material selected from the group consisting of dolomite, basalt, granite, diabase, dolerite, or recycled slag. Due to its hydrophilic nature, the rock mineral wool layer (110) can retain moisture therein for more than 10 hours, thus ensuring that the grass mat is always hydrated. In another embodiment, the thickness of the rock wool layer (110) ranges between 10 mm to 100 mm. In a preferred embodiment, the thickness of the rock wool layer (110) ranges between 20 mm to 40 mm.

In an embodiment, the rock mineral wool layer (110) is fastened on the drainage sheet (105) with the help of fasteners (130). In another embodiment, the fasteners are fastened temporarily rock mineral wool layer (110)

In an embodiment, the vertical lawn (100) includes a plurality of brackets (127) configured to be fixed to the bottom layer of the rock mineral wool layer (110). The brackets (127) are fixed such that they protrude out through the rock mineral wool layer (110) and through the lawn mat (115).

In another embodiment, the vertical lawn (100) includes a plurality of metal strip fitments (125) configured to be laid across the lawn mat (115). The strip fitments (125) are configured to be fastening received in the brackets (127) to securely hold the lawn mat (115) to the rock mineral wool layer (110), and prevent slippage of the lawn mat (115).

Figure 2A:
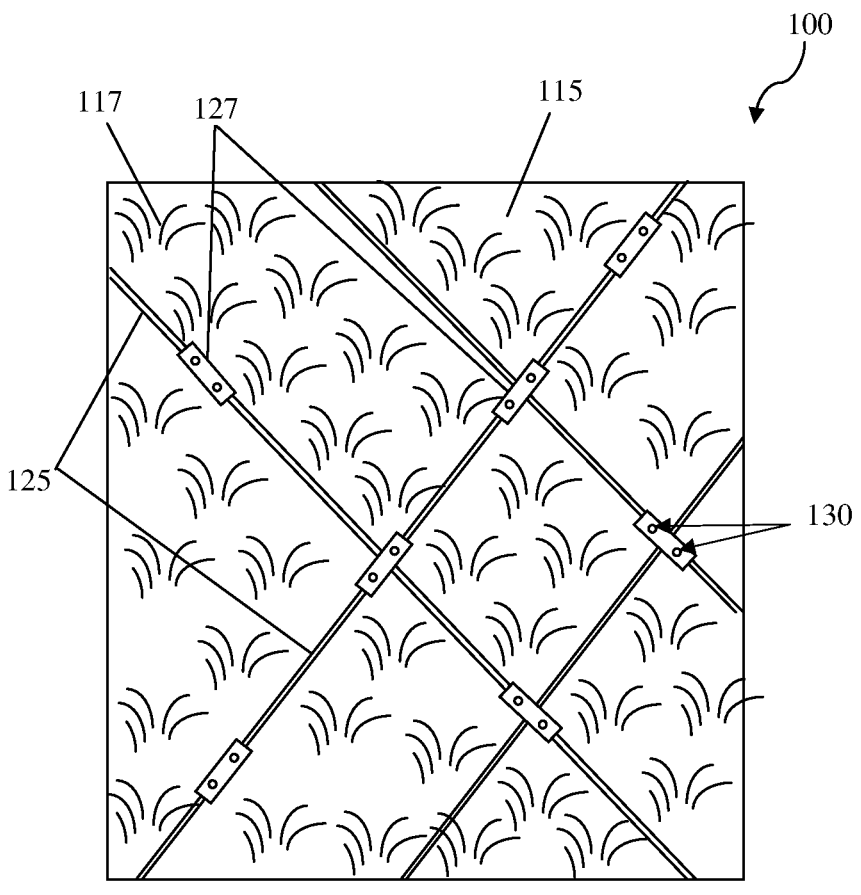
FIG. 2A and FIG. 2B illustrates an operative front view of the lawn of FIG. 1.
Figure 2B:
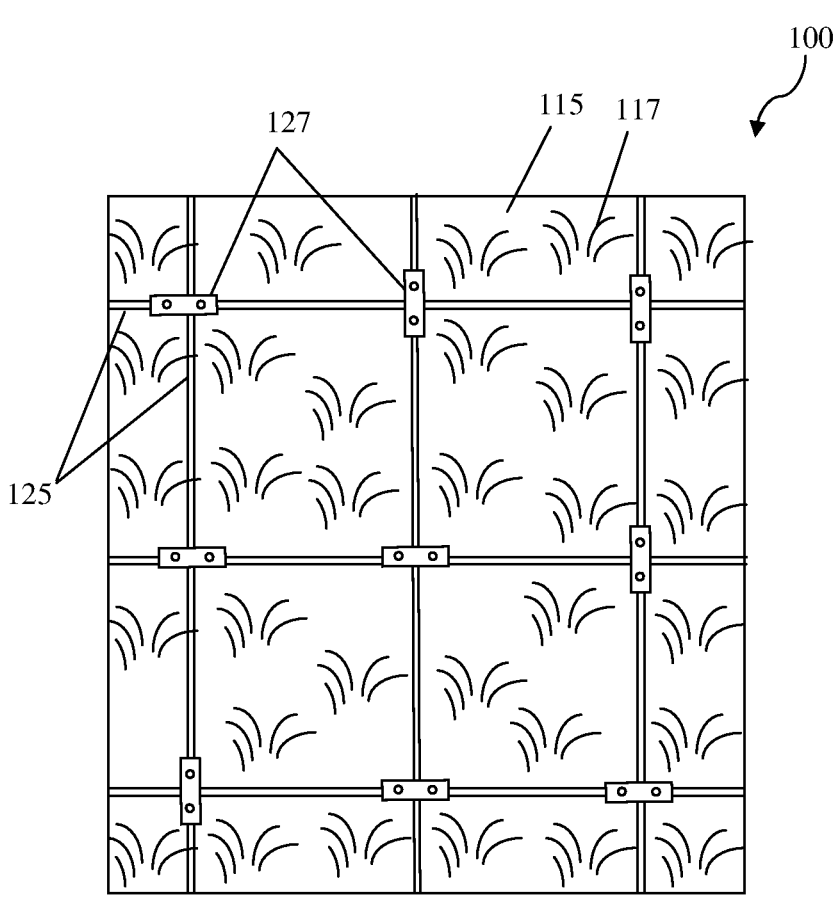

In yet another embodiment, the strip fitments (125) are laid across the lawn mat (115) in a crisscross manner, as shown in FIG. 2A and FIG. 2B. In still another embodiment, the strip fitments (125) are configured as a prefabricated meshed panel.

Figure 4:
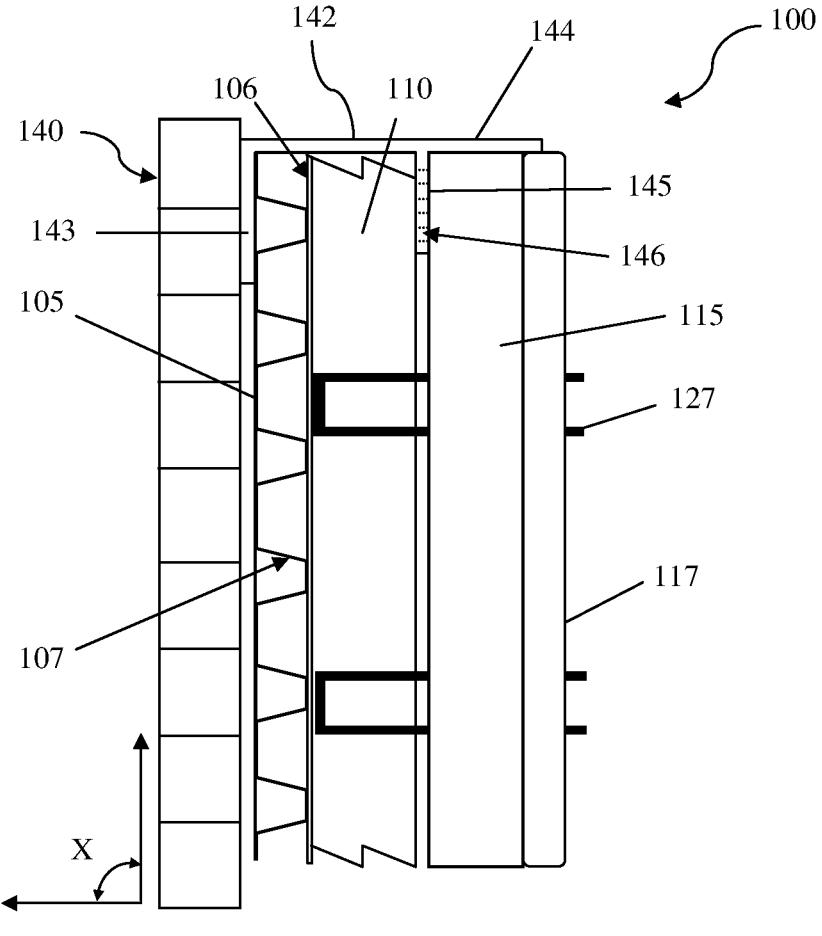
FIG. 4 illustrates a cross-sectional side view of the lawn, of FIG. 1A, provided with a bracket.

In an embodiment, as shown in FIG. 4, the vertical lawn (100) includes a brace (142) having an L-shaped configuration defined by a base (143) and a first arm (144) extending from a first edge of the base (143). The brace (142) further includes an intermediate arm (145) extending from the first arm at a spaced apart distance from the base (143), in a direction parallel to the base (143).

In an embodiment, a plurality of perforations (146) is configured on the intermediate arm (145). In another embodiment, the intermediate arm (145) has a meshed configuration (not shown in Figures).

The base (143), of the brace (142), is configured to be attached to the substrate (140) and to an operative top portion of the drainage sheet (105) with the help of fasteners (not specifically shown in Figures). More specifically, the base (143) is inserted between the substrate (140) and the operative top portion of the drainage sheet (105). The brace (142) is configured to support the vertical lawn especially in high wind flow regions. Further, the drainage sheet (105) and the rock mineral wool layer (110) are received in the space defined between the base (143) and the intermediate arm (145). The perforations (146) or the meshed configuration of the intermediate arm (145) facilitates the roots of the lawn to grow into the rock mineral wool layer (110) therethrough, in addition to facilitating flow of water into the rock mineral wool layer (110).

In an embodiment, the lawn mat (115) includes a lawn substrate having a grass layer (117) grown thereon. In another embodiment, the grass layer (117) is selected from the group consisting of grass, sedum, succulents, hydroponics or herbs. In yet another embodiment, the thickness of the lawn mat (115) ranges between 30 mm and 80 mm.

In an operative configuration, after the rock mineral wool layer (110) is fitted on the drainage sheet (105), the rock mineral wool layer (110) is moistened. Thereafter, the lawn mat (115) is fitted on the rock mineral wool layer (110). The rock mineral wool layer (110) is periodically moistened to keep the lawn mat (115) moist by watering the lawn mat (115) and the rock mineral wool layer (110). Excess water percolates from the rock mineral wool layer (110) to the geotextile sheet (106). From the geotextile sheet (106), water passes on to the drainage sheet (105), where water is flown away through the path created between the projections (107).

The drainage sheet (105) prevents the wall (140) from coming in contact with moisture. On the other hand, the rock mineral wool layer (110) provides support to the roots of the vegetation of the lawn mat (115). Once the vegetation has rooted through the soil and the rock mineral wool layer (110), the strip fitments (125) are removed.

The vertical lawn (100) helps not only in increasing the aesthetic appeal of the building or space it is planted in, but also helps in reducing urban heat island effect. More specifically, the vertical lawn (100) will absorb a lot of heat and the absorbed heat energy used will be used for evaporation and transpiration by the plants which will help not increasing the temperature of the atmosphere surrounding it and also of the concrete surface. Further, the lawn/plants/grass will absorb $CO_2$ and give out oxygen which will reduce the $CO_2$ emissions. Also the air particulate matter that settles on the leaves will be reduced thereby, reducing the air pollution in the atmosphere.

Moreover, the energy absorbed by the lawn (100) will not be transferred to the surface behind it, thus leading to a cooler indoor temperature that will increase the thermal efficiency of the building and reduce the energy requirement.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

TECHNICAL ADVANCEMENTS

The present disclosure described hereinabove has several technical advantages including, but not limited to, the realization of a vertical lawn which:

adds to the aesthetic appeal of spaces;
allows draining of water therefrom, without affecting walls on which they are supported;
reduces urban heat island effect;
reduces air pollution and $CO_2$ content in the air; and
increasing the thermal efficiency of the building.

The foregoing disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Any discussion of materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:
1. A vertical lawn configured to incline at an angle ranging between 45° to 120° with respect to ground, the vertical lawn comprising:
an artificial substrate;

a water-proofing layer having a thickness of 100 microns to 2000 microns of natural water-repellant material or a layer of synthetic water-repellant material selected from the group consisting of elastomeric material, cementitious material, latex, acrylic, polyurethane or a combination thereof applied on said substrate;

a drainage sheet made of a material selected from the group consisting of low density polyethylene (LDPE), high density polyethylene (HDPE), polypropylene, polyolefins, polyvinyl chloride, polyesters, polystyrene, recycled polymers, composites or a combination thereof, with a thickness between 0.5 mm to 1.5 mm provided on said water-proofing layer;

a geotextile sheet manufactured from non-woven continuous fibers of a material selected from polypropylene, polyethylene, polyester (PET), virgin polymer, recycled polymer, composites, or a combination thereof, with a thickness of 0.3 mm to 40 mm and a weight between 80 GSM to 4000 GSM, fitted on an operative front surface of said drainage sheet;

a hydrophilic rock mineral wool layer made of a material selected from the group consisting of dolomite, basalt, granite, diabase, dolerite, or recycled slag, with a thickness of 10 mm to 100 mm fastened on the drainage sheet with the help of fasteners (130), secured to said operative front surface of said geotextile sheet, said rock mineral wool layer configured to absorb and retain moisture therein;

a lawn mat having a thickness of 30 mm to 80 mm, secured to said rock mineral wool layer, wherein said lawn mat includes a lawn substrate having a grass layer grown thereon, said grass layer is selected from the group consisting of grass, sedum, succulents, hydroponics or herbs;

a plurality of brackets configured to be fixed to the bottom layer of the rock mineral wool layer such that said brackets protrude out through said rock mineral wool layer and said lawn mat; and metal strip fitments configured to be laid across said lawn mat, said strip fitments configured to be received in said brackets to securely hold said lawn mat, and configured as a prefabricated meshed panel, said strip fitments are laid across the lawn mat in a crisscross manner;

wherein said drainage sheet has a plurality of projections with a height between 4 mm to 25 mm, a configuration selected from the group consisting of cup-shaped configuration, staggered configuration, trapezoidal configuration, and dimpled configuration, with a shape selected from the group consisting of circular, elliptical, ovular, rectangular, and octagonal, the plurality of projections configured on the drainage sheet to facilitate the flow of water between said projections, and wherein said vertical lawn includes a brace, said brace being configured to be attached to said substrate and to said drainage sheet to provide additional support to said vertical lawn, wherein said brace has an L-shaped configuration defined by a base, a first arm extending from a first edge of the base, and an intermediate arm extending from the first arm at a spaced apart distance from the base, in a direction parallel to the base.

2. The vertical lawn as claimed in claim 1, wherein said water-proofing layer is a water-repellent sheet.

3. The vertical lawn as claimed in claim 1, wherein said water-proofing layer is a liquid water-repellent applied in coats.

4. The vertical lawn as claimed in claim 1, wherein said projections are configured on both operative front surface and operative back surface of said drainage sheet.

5. The vertical lawn as claimed in claim 1, wherein said projections are configured on the drainage sheet in a staggered configuration.

6. The vertical lawn as claimed in claim 1, wherein weight of said geotextile sheet ranges between 80 GSM to 1000 GSM.

7. The vertical lawn as claimed in claim 1, wherein the thickness of said rock wool layer ranges between 20 mm to 40 mm.

8. The vertical lawn as claimed in claim 1, wherein said intermediate arm has a meshed configuration to facilitate flow of water therethrough along with a plurality of perforations configured on the intermediate arm.

* * * * *